United States Patent
Dai et al.

(10) Patent No.: US 11,636,347 B2
(45) Date of Patent: Apr. 25, 2023

(54) ACTION SELECTION USING INTERACTION HISTORY GRAPHS

(71) Applicant: DeepMind Technologies Limited, London (GB)

(72) Inventors: Hanjun Dai, Atlanta, GA (US); Yujia Li, London (GB); Chenglong Wang, Seattle, WA (US); Rishabh Singh, San Jose, CA (US); Po-Sen Huang, London (GB); Pushmeet Kohli, London (GB)

(73) Assignee: DeepMind Technologies Limited, London (GB)

( * ) Notice: Subject to any disclaimer, the term of this patent is extended or adjusted under 35 U.S.C. 154(b) by 511 days.

(21) Appl. No.: 16/749,252

(22) Filed: Jan. 22, 2020

(65) Prior Publication Data

US 2020/0234145 A1 Jul. 23, 2020

Related U.S. Application Data

(60) Provisional application No. 62/796,025, filed on Jan. 23, 2019.

(51) Int. Cl.
*G06N 3/08* (2006.01)
*G06K 9/62* (2022.01)
(Continued)

(52) U.S. Cl.
CPC ........... *G06N 3/088* (2013.01); *G06K 9/6257* (2013.01); *G06N 3/049* (2013.01)

(58) Field of Classification Search
CPC ...... G06N 3/088; G06N 3/049; G06N 3/0481; G06N 3/0445; G06N 3/0454; G06N 3/084;
(Continued)

(56) References Cited

U.S. PATENT DOCUMENTS

| 2010/0241243 | A1* | 9/2010 | Hans | G06N 20/00 700/12 |
| 2015/0227121 | A1* | 8/2015 | Dull | G06N 7/00 700/287 |

FOREIGN PATENT DOCUMENTS

WO WO 2018/153807 8/2018

OTHER PUBLICATIONS

NerveNet learning structured policy, Wang et al, 2018; https://openreview.net/pdf?id=S1sqHMZCb (Year: 2018).*
(Continued)

*Primary Examiner* — Jianxun Yang
(74) *Attorney, Agent, or Firm* — Fish & Richardson P.C.

(57) ABSTRACT

Methods, systems, and apparatus, including computer programs encoded on a computer storage medium, for selecting actions to be performed by an agent interacting with an environment. In one aspect, a method comprises: obtaining a graph of nodes and edges that represents an interaction history of the agent with the environment; generating an encoded representation of the graph representing the interaction history of the agent with the environment; processing an input based on the encoded representation of the graph using an action selection neural network, in accordance with current values of action selection neural network parameters, to generate an action selection output; and selecting an action from a plurality of possible actions to be performed by the agent using the action selection output generated by the action selection neural network.

18 Claims, 5 Drawing Sheets

(51) Int. Cl.
    *G06N 3/04*     (2006.01)
    *G06N 3/088*    (2023.01)
    *G06N 3/049*    (2023.01)

(58) Field of Classification Search
    CPC ...... G06N 5/022; G06N 3/006; G06K 9/6257;
              G06K 9/627; G06K 9/6296; G06V 10/82
    See application file for complete search history.

(56) References Cited

OTHER PUBLICATIONS

International Preliminary Report on Patentability in International Appln. No. PCT/EP2020/051547, dated Aug. 5, 2021, 14 pages.
Battaglia et al., "Relational inductive biases, deep learning, and graph networks," https://arxiv.org/abs/1806.01261v3, 40 pages.
Dai et al., "Learning Transferable Graph Exploration," https://arxiv.org/abs/1910.12980, Oct. 2019, 18 pages.
PCT International Search Report and Written Opinion in International Appln. No. PCT/EP2020/051547, dated Apr. 30, 2020, 20 pages.
Wang et al., "NerveNet: Learning Structured Policy with Graph Neural Networks," 6th International Conference on Learning Representations (ICLR 2018), Mar. 2018, 26 pages.
Zambaldi et al., "Deep Reinforcement Learning with Relational Inductive Biases," ICLR, retrieved from URL <https://openreview.net/pdf?id=HkxaFoC9KQ>, Nov. 2018, 18 pages.
Allamanis et al., "Learning to Represent Programs with Graphs," https://arxiv.org/abs/1711.00740v1, Nov. 2017, 16 pages.
Azim et al., "Targeted and Depth-first Exploration for Systematic Testing of Android Apps," Proceedings of the 2013 ACM SIGPLAN international conference on Object oriented programming systems languages & applications, Oct. 2013, 48:20 pages.
Battaglia et al., "Relational inductive biases, deep learning, and graph networks," https://arxiv.org/abs/1806.01261v1, Jun. 2018, 37 pages.
Bellemare et al., "Unifying Count-Based Exploration and Intrinsic Motivation," Advances in Neural Information Processing Systems, 2016, 9 pages.
Bello et al., "Neural Combinatorial Optimization with Reinforcement Learning," https://arxiv.org/abs/1611.09940v1, Nov. 2016, 13 pages.
Bunel et al., "Leveraging Grammar and Reinforcement Learning for Neural Program Synthesis," https://arxiv.org/abs/1805.04276v1, May 2018, 15 pages.
Cadar et al., "Symbolic Execution for Software Testing: Three Decades Later," Communications of the ACM, Feb. 2013, 56(2):82-90.
Carlone et al., "Active SLAM and Exploration with Particle Filters Using Kullback-Leibler Divergence," Journal of Intelligent & Robotic Systems, Aug. 2014, 75(2):21 pages.
Carrillo et al., "On the Comparison of Uncertainty Criteria for Active SLAM," 2012 IEEE International Conference on Robotics and Automation, May 2012, 2080-2087.
Dai et al., "Discriminative Embeddings of Latent Variable Models for Structured Data," Proceedings of the 33rd International Conference on Machine Learning, 2016, 10 pages.
Dai et al., "Learning Combinatorial Optimization Algorithms over Graphs," https://arxiv.org/abs/1704.01665v1, Apr. 2017, 26 pages.
De Moura et al., "Z3: An Efficient SMT Solver," International Conference on Tools and Algorithms for the Construction and Analysis of Systems (TACAS 2008), Mar. 2008, 337-340.
Devlin et al., "RobustFill: Neural Program Learning under Noisy I/O," https://arxiv.org/abs/1703.07469, Mar. 2017, 18 pages.
Duan et al., "RL2: Fast Reinforcement Learning via Slow Reinforcement Learning," Nov. 2016, 14 pages.
Durrant-Whyte et al., "Simultaneous Localization and Mapping: Part I," IEEE Robotics & Automation Magazine, Jun. 2006, 13(2):99-108.
Eysenbach et al., "Diversity is All You Need: Learning Skills without a Reward Function," https://arxiv.org/abs/1802.06070v1, Feb. 2018, 15 pages.
Gilmer et al., "Neural Message Passing for Quantum Chemistry," https://arxiv.org/abs/1704.01212v1, Apr. 2017, 13 pages.
Godefroid et al., "Automated Whitebox Fuzz Testing," Proceedings of the Network and Distributed System Security Symposium, retrieved from URL <https://www.ndss-symposium.org/wp-content/uploads/2017/09/Automated-Whitebox-Fuzz-Testing-paper-Patrice-Godefroid.pdf>, Feb. 2008, 16 pages.
Godefroid et al., "Learn&Fuzz: Machine Learning for Input Fuzzing," 2017 32nd IEEE/ACM International Conference on Automated Software Engineering (ASE), Oct. 2017, 50-59.
Guez et al., "Learning to Search with MCTSnets," https://arxiv.org/abs/1802.04697v1, Feb. 2018, 12 pages.
Gupta et al., "Meta-Reinforcement Learning of Structured Exploration Strategies," https://arxiv.org/abs/1802.07245, Feb. 2018, 11 pages.
Hamilton et al., "Inductive Representation Learning on Large Graphs," Advances in Neural Information Processing Systems, 2017, 11 pages.
Jia et al., "DOM-Q-NET: Grounded RL on Structured Language," https://arxiv.org/abs/1902.07257, Feb. 2019, 17 pages.
Johnson, "Learning Graphical State Transitions," ICLR, Oct. 2016, 19 pages.
Khalil et al., "Learning Combinatorial Optimization Algorithms over Graphs," Advances in Neural Information Processing Systems, Dec. 2017, 11 pages.
Kipf et al., "Semi-Supervised Classification with Graph Convolutional Networks," https://arxiv.org/abs/1609.02907v1, Sep. 2016, 10 pages.
Lei et al., "Deriving Neural Architectures from Sequence and Graph Kernels," https://arxiv.org/abs/1705.09037v1, May 2017, 21 pages.
Lemieux et al., "FairFuzz: A Targeted Mutation Strategy for Increasing Greybox Fuzz Testing Coverage," Proceedings of the 33rd ACM/IEEE International Conference on Automated Software Engineering, Sep. 2018, 475-485.
Li et al., "Combinatorial Optimization with Graph Convolutional Networks and Guided Tree Search," Advances in Neural Information Processing Systems, Dec. 2018, 10 pages.
Li et al., "Gated Graph Sequence Neural Networks," https://arxiv.org/abs/1511.05493v1, Nov. 2015, 15 pages.
Liu et al., "DeepFuzz: Automatic Generation of Syntax Valid C Programs for Fuzz Testing," Proceedings of the AAAI Conference on Artificial Intelligence, Jul. 2019, 8 pages.
Mao et al., "Sapienz: Multi-objective Automated Testing for Android Applications," Proceedings of the 25th International Symposium on Software Testing and Analysis, Jul. 2016, 94-105.
Miller et al., "An empirical study of the reliability of UNIX utilities," Communications of the ACM, Dec. 1990, 33(12):32-44.
Mirowski et al., "Learning to Navigate in Complex Environments," https://arxiv.org/abs/1611.03673v1, Nov. 2016, 12 pages.
Mnih et al., "Asynchronous Methods for Deep Reinforcement Learning," Proceedings of the 33rd International Conference on Machine Learning, 2016, 1928-1937.
Mu et al., "Information-based Active SLAM via topological feature graphs," 2016 IEEE 55th Conference on Decision and Control (CDC), Dec. 2016, 5583-5590.
Nowak et al., "A Note on Learning Algorithms for Quadratic Assignment with Graph Neural Networks," https://arxiv.org/abs/1706.07450v1, Jun. 2017, 6 pages.
Ostrovski et al., "Count-Based Exploration with Neural Density Models," https://arxiv.org/abs/1703.01310v1, Mar. 2017, 15 pages.
Pathak et al., "Curiosity-driven Exploration by Self-supervised Prediction," https://arxiv.org/abs/1705.05363, May 2017, 12 pages.
Pritzel et al., "Neural Episodic Control," https://arxiv.org/abs/1703.01988, Mar. 2017, 12 pages.
Pu et al., "Selecting Representative Examples for Program Synthesis," International Conference on Machine Learning, 2018, 10 pages.
Rajpal et al., "Not all bytes are equal: Neural byte sieve for fuzzing," https://arxiv.org/abs/1711.04596, Nov. 2017, 10 pages.

(56) References Cited

OTHER PUBLICATIONS

Scarselli et al., "The graph neural network model," IEEE Transactions on Neural Networks, retrieved from URL <https://ro.uow.edu.au/cgi/viewcontent.cgi?referer=https://scholar.google.com/&httpsredir=1&article=10501&context=infopapers>, Jan. 2009, 20(1):61-80.
Selsam et al., "Learning a SAT Solver from Single-Bit Supervision," https://arxiv.org/abs/1802.03685v1, Feb. 2018, 9 pages.
Sen et al., "CUTE: A Concolic Unit Testing Engine for C," Proceedings of the 10th European Software Engineering Conference held jointly with 13th ACM SIGSOFT International Symposium on Foundations of Software Engineering, Sep. 2005, 263-272.
Sen, "DART: Directed Automated Random Testing," Hardware and Software: Verification and Testing, 5th International Haifa Verification Conference (HVC), Oct. 2009, 1 page.
She et al., "NEUZZ: Efficient Fuzzing with Neural Program Learning," https://arxiv.org/abs/1807.05620v1, Jul. 2018, 13 pages.
Shin et al., "Synthetic Datasets for Neural Program Synthesis," https://arxiv.org/abs/1912.12345, Dec. 2019, 16 pages.
Velickovic et al., "Graph Attention Networks," https://arxiv.org/abs/1710.10903v1, Oct. 2017, 11 pages.
Wang et al., "Learning to reinforcement learn," https://arxiv.org/abs/1611.05763v1, Nov. 2016, 17 pages.
Nakashima et al., "Wireless LAN Optimal Channel Control Using Depths Strengthening Study," IEICE Technical Report, General Incorporated Foundation Institute of Electronics, Information and Communication Engineers, 2019, 118(428):13-18 (with English abstract).
Office Action in Japanese Appln. No. 2021-542496, dated Oct. 3, 2022, 15 pages (with English translation).

\* cited by examiner

RANDOM EXPLORATION

EXPLORATION SYSTEM

ACTION SELECTION USING INTERACTION HISTORY GRAPHS

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that selects actions to be performed by an agent interacting with an environment to enable the agent to efficiently explore the environment.

According to a first aspect there is provided a method performed by one or more data processing apparatus for selecting actions to be performed by an agent interacting with an environment. The method includes obtaining a graph of nodes and edges that represents an interaction history of the agent with the environment. Each node in the graph represents a possible state of the environment, each edge in the graph connects a respective pair of nodes in the graph, and an edge in the graph connects a pair of nodes in the graph only if the state of the environment can transition from one of the nodes in the pair of nodes to the other node in the pair of nodes. An encoded representation of the graph representing the interaction history of the agent with the environment is generated. An input based on (and/or comprising) the encoded representation of the graph is processed using an action selection neural network, in accordance with current values of action selection neural network parameters, to generate an action selection output. An action is selected from a set of possible actions to be performed by the agent using the action selection output generated by the action selection neural network.

In some implementations, the method further includes identifying one or more new states of the environment, where: (i) the state of the environment transitions into the one or more new states as a result of the agent performing the selected action, and (ii) the state of the environment did not previously transition into any of the new states as a result of the agent performing previously selected actions during the interaction of the agent with the environment. A reward is determined based on the new states of the environment. The current values of the action selection neural network parameters are adjusted based on the reward using a reinforcement learning technique.

In some implementations, determining the reward based on the new states of the environment includes determining the reward based on the number of new states of the environment.

In some implementations, the reinforcement learning technique is an actor-critic reinforcement learning technique.

In some implementations, each node in the graph that represents the interaction history of the agent with the environment corresponds to a state of the environment that the environment previously transitioned into as a result of the agent performing previously selected actions during the interaction of the agent with the environment.

In some implementations, each edge in the graph connects a pair of nodes in the graph only if the state of the environment previously transitioned from one of the nodes in the pair of nodes to the other node in the pair of nodes as a result of the agent performing previously selected actions during the interaction of the agent with the environment.

In some implementations, the environment is a software environment, each state of the software environment corresponds to a respective state of a user interface of the software environment, and the action selected to be performed by the agent defines a particular interaction with the user interface of the software environment.

In some implementations, the environment is a real-world environment, each state of the real-world environment corresponds to a respective spatial position in the real-world environment, the agent is a robotic agent interacting with the real-world environment, and the action selected to be performed by the agent defines a physical action that causes the agent to move in the real-world environment.

In some implementations, the nodes in the graph that represents the interaction history of the agent with the environment represent every possible state of the environment; and each node in the graph is associated with data that indicates whether the environment previously transitioned into the state represented by the node as a result of the agent performing previously selected actions during the interaction of the agent with the environment.

In some implementations, the environment is a software environment defined by a set of program code, each state of the software environment corresponds to execution of a respective element of the set of program code, and the action selected to be performed by the agent defines an input to be provided to the software environment.

In some implementations, the software environment defines a user interface.

In some implementations, generating an encoded representation of the graph representing the interaction history of the agent with the environment includes processing the graph using a graph neural network to generate the encoded representation of the graph.

In some implementations, processing the graph using a graph neural network to generate the encoded representation of the graph includes: generating a respective encoded representation of each node of the graph; and combining the respective encoded representation of each node of graph to generate the encoded representation of the graph.

In some implementations, combining the respective encoded representation of each node of the graph includes summing the respective encoded representations of each node of the graph.

In some implementations, summing the respective encoded representations of each node of the graph includes: determining a respective weight factor for the encoded representation of each node of the graph; and scaling the encoded representation of each node of the graph using the corresponding weight factor prior to summing the respective encoded representations of each node of the graph.

In some implementations, generating a respective encoded representation of each node of the graph includes updating an encoded representation of each node of the graph at each of multiple iterations. At each iteration after a first iteration of the multiple iterations, the method may include, for each given node of the graph, updating the encoded representation of the node at the current iteration based on the encoded representations of a set of neighboring nodes of the given node in the graph at a previous iteration in accordance with values of graph neural network parameters. The set of neighboring nodes of the given node in the graph includes: (i) the given node, and (ii) each other node in the graph that is connected to the given node by an edge of the graph. The encoded representation of each node of the graph is determined as the encoded representation of the node after a last iteration of the multiple iterations.

In some implementations, the method further includes determining an encoded representation of each node of the graph at the first iteration of the multiple iterations based on characteristics of the state of the environment represented by the node.

In some implementations, the graph neural network is trained using an unsupervised link prediction objective.

In some implementations, the action selection neural network is a recurrent neural network.

In some implementations, the action selection output defines a respective value for each action of multiple possible actions.

In some implementations, selecting the action to be performed by the agent using the action selection output includes sampling the action in accordance with probabilities for each of the actions which are the respective values for the actions defined by the action selection output.

In some implementations, selecting the action to be performed by the agent using the action selection output includes selecting the action with the highest value.

In some implementations, the current values of the action selection neural network parameters are determined during interaction of the agent with a previous environment and are not adjusted during the interaction of the agent with the environment.

In some implementations, the input to the action selection neural network is based on: (i) the encoded representation of the graph, and (ii) encoded representations of one or more previous graphs, where each previous graph represents an interaction history of the agent with the environment as of a respective previous time step.

In some implementations, the method further includes using a recurrent neural network to process an input including: (i) the encoded representation of the graph, and (ii) an output of the recurrent neural network at a previous time step, to generate a recurrent neural network output. The input to the action selection neural network includes the recurrent neural network output.

According to a second aspect there is provided a system including one or more computers and one or more storage devices storing instructions that when executed by the one or more computers cause the one or more computers to perform operations including the operations of the method of the first aspect.

According to a third aspect there is provided a non-transitory computer program product storing instructions that when executed by one or more computers cause the one or more computers to perform operations including the operations of the method of the first aspect.

Particular embodiments of the subject matter described in this specification can be implemented so as to realize one or more of the following advantages.

The exploration system described in this specification can be trained using reinforcement learning techniques to select actions that cause an agent to efficiently explore an environment. The exploration system can select actions to be performed by the agent based on a graph that represents the interaction history of the agent with the environment, for example, by representing which states the agent has already explored in the environment. The exploration system can learn a more effective exploration policy over fewer training iterations by selecting actions based on a graph that represents the interaction history of the agent with the environment than would be possible if it selected actions based on less information (e.g., just the current state of the environment). For example, the exploration system can be trained using rewards that encourage the selection of actions that cause the environment to transition into "new" (i.e., previously unseen) states. In particular, the exploration system may receive a positive reward the first time it causes the state of the environment to transition into a given state, but no reward for any subsequent occasions the environment transitions into the given state. If the exploration system selected actions based on only the current state of the environment, the rewards received by the exploration system would therefore appear to be inconsistent. On the other hand, by processing a graph that represents the interaction history of the agent with the environment, the rewards received by the exploration system appear consistent and therefore enable the exploration system to be trained more effectively.

The exploration system can select the action to be performed by the agent at each time step based on multiple respective graphs representing the interaction history of the agent with the environment as of: (i) the current time step, and (ii) each of one or more previous time steps. That is, the exploration system can select the action to be performed at each time step based on the history of the exploration of the environment by the agent over multiple previous time steps. This may enable more efficient exploration, i.e., by enabling the exploration system to reason more effectively about which actions will result in the environment transitioning into new states.

The exploration system is generalizable, that is, it can be used to select actions that cause an agent to efficiently explore an environment even if the agent was not exposed to the environment during training. Therefore, the exploration system may reduce consumption of computational resources (e.g., memory and computing power) by obviating the need to re-train the action selection network each time the agent interacts with a new environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
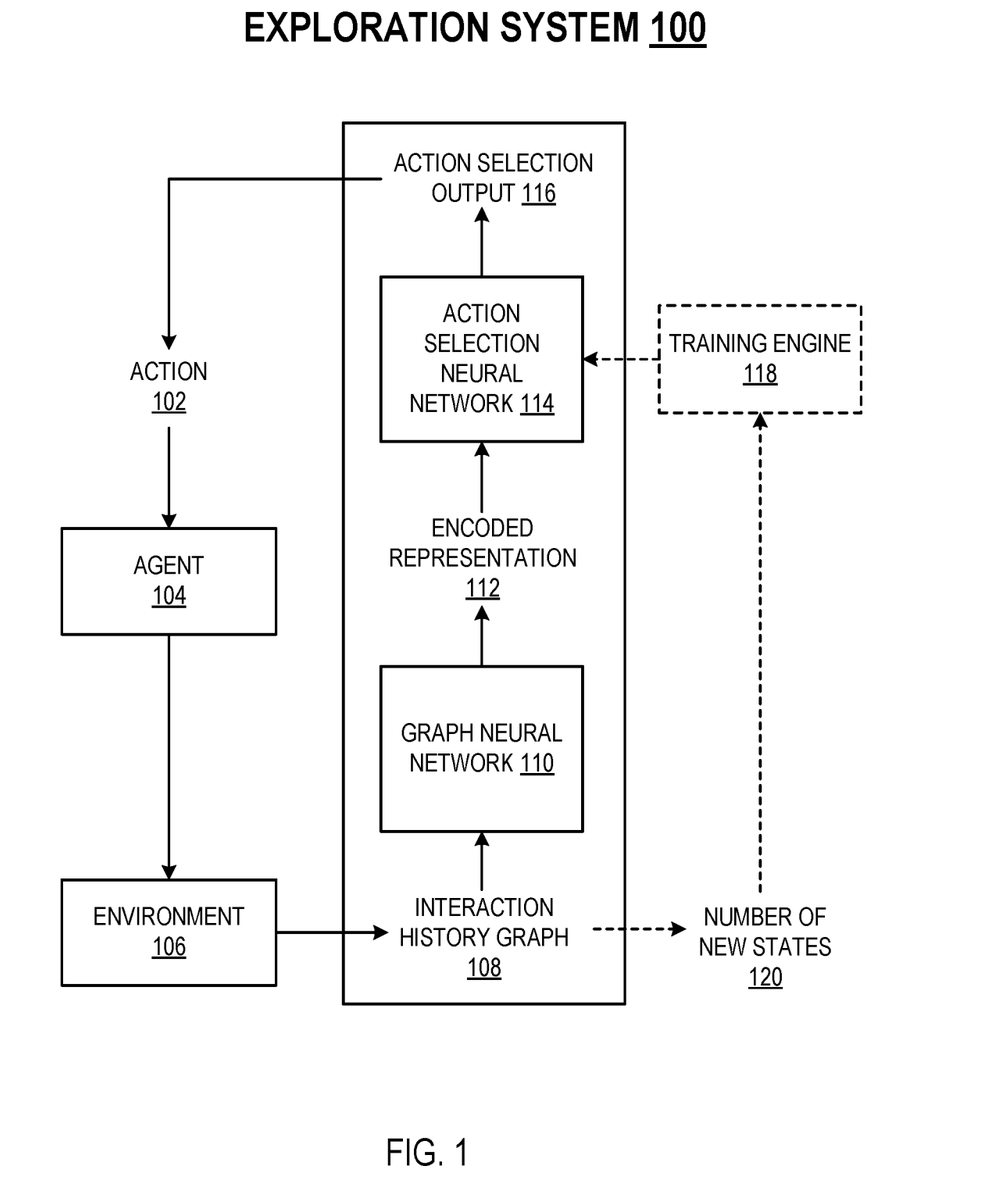
FIG. 1 shows an example exploration system.

FIG. 1 shows an example exploration system 100. The exploration system 100 is an example of a system implemented as computer programs on one or more computers in one or more locations in which the systems, components, and techniques described below are implemented.

The exploration system 100 selects actions 102 to be performed by an agent 104 interacting with an environment 106 at each of multiple steps. The exploration system 100 is trained to select actions 102 that enable the agent 104 to efficiently explore the environment 106. That is, the exploration system 100 selects actions 102 that are intended to maximize the number of unique states that are transitioned into by the environment 106 over a limited number of time steps.

The exploration system 100 described herein is widely applicable and is not limited to one specific implementation. However, for illustrative purposes, a few example implementations of the exploration system 100 are described next.

In some implementations, the agent may be a software agent, the environment may be a software environment, and each state of the environment may correspond to a respective state of a user interface, e.g., of a software application. Each action performed by the agent may be an action to interact with the user interface, e.g., by selecting interactive elements (e.g., buttons) in the user interface, or by providing alpha-numeric inputs to the user interface (e.g., as from a keyboard). At each time step, the exploration system may select an action that specifies a particular interaction with the user interface, and the user interface may transition into a different state based on the current state of the user interface and the action performed by the agent.

In some implementations, the agent may be a software agent and the environment may be a software environment defined by a set of program code, e.g., expressed in Python, Java, or in any other appropriate manner. The set of program code may be configured to receive and process inputs, e.g., strings of characters or images. Each time the program code processes an input, some elements (e.g., instructions or groups of instructions) of the program code may execute while others may not, i.e., depending on the input. Each state of the software environment may correspond to the execution of a respective element of the program code. At each time step, the exploration system may select an action that specifies an input to be processed to the program code, and the environment may transition into one or more states as one or more corresponding elements of the program code execute during processing of the input.

By performing actions which cause a user interface to transition to as many distinct states as possible, or which cause as many elements of a set of program code to execute as possible, the exploration system 100 increases the likelihood of triggering potential "bugs". A bug refers to a defect that causes a software environment to behave incorrectly. In this manner, the exploration system 100 can be used to perform software testing, e.g., of a user interface or a set of program code. Once the bug is identified, the software may be modified (automatically and/or by a human operator), thereby providing better software, such as an improved user interface. The user interface is less subject to bugs. Alternatively or additionally it may allow a user to enter data more reliably and/or more quickly and/or with less effort.

In some implementations, the agent may be a mechanical agent (e.g., a robot or an autonomous or semi-autonomous vehicle), the environment may be a real-world environment, and each state of the real-world environment may correspond to a respective spatial position (location and/or configuration) in the real-world environment. "Spatial locations" in a real-world environment may correspond to respective regions of the real-world environment, e.g., specified by a dividing the real-world environment into a predefined grid (or in any other appropriate manner). The state of the environment at the start of each step is measured by a sensor, e.g. a camera or a geo-location sensor. At each time step, the exploration system may select an action that causes the agent to move in the environment (i.e. to move from one spatial location to another spatial position and/or to change its configuration); for example, the actions may specify torques to be applied to the joints of a robot to cause the robot to move. Performing actions which cause the agent to visit as many different spatial positions in the environment as possible may enable the agent to build a map of the environment and acquire information that can be used to perform other tasks more effectively. In this manner, the exploration system 100 can be used by a mechanical agent to explore a real-world environment.

At each time step, the exploration system 100 generates an interaction history graph 108 that represents the interaction history of the agent 104 with the environment, i.e., by representing which states the environment has transitioned into as a result of previous interactions of the agent with the environment. The graph 108 includes a set of nodes and a set of edges, where each node represents a possible state of the environment and each edge connects a respective pairs of nodes in the graph. An edge in the graph 108 connects a pair of nodes only if the environment 106 can transition from the state represented by one of the nodes in the pair to the state represented by the other node in the pair.

In implementations corresponding to exploration in an unknown environment, the graph 108 represents only the states of the environment 106 that have already been explored by the agent 104 as of the current time step. In particular, the graph 108 may include only nodes representing states that the environment has transitioned into at one or more previous time steps, and only edges representing transitions between environment states that have occurred at one or more previous time steps. In one example, the agent may be a mechanical agent exploring an unknown real-world environment, each node may represent a spatial position in the environment that the agent has visited, and each edge may represent previous movement of the agent from one spatial location to another in the environment.

In implementations corresponding to exploration in a known environment, the graph may represent every state of the environment 106 and if so is associated with additional data specifying which states the environment has transitioned into at one or more previous time steps. In particular, the graph 108 may include respective nodes representing every possible state of the environment, and respective features associated with each node that specify whether the environment has transitioned into the state corresponding to the node at one or more previous time steps. In one example, the agent may be a software agent testing a known set of program code, each node may represent an element (e.g., instruction) in the program code, and each node may have an associated feature that specifies whether the corresponding element of the program code has executed at one or more previous time steps.

At the first time step, the exploration system 100 may generate an initial interaction history graph 108 reflecting that the agent has not yet explored the environment 106. In one example, the exploration system 100 may generate an "empty" interaction history graph 108 at the first time step, i.e., a graph without any nodes or edges. In another example, the exploration system 100 may generate an interaction history graph 108 representing every state of the environment, with node features indicating that the environment has not yet transitioned into any of those states.

At each time step after the first time step, the exploration system 100 may generate the interaction history graph 108 for the time step by updating the interaction history graph generated at the previous time step. For example, the exploration system 100 may generate the interaction history graph 108 for the time step by adding an additional node and/or edge to the graph 108 generated at the previous time step based on the one or more states the environment transitioned into at the previous time step.

After generating the interaction history graph 108 for the current time step, the exploration system 100 may process the interaction history graph 108 using a graph neural network 110 to generate an encoded representation 112 of the interaction history graph 108. The encoded representation 112 of the graph 108 may be represented as an ordered collection of numerical values, e.g., a vector or matrix of numerical values. The graph neural network 110 may generate the encoded representation 112 of the graph 108, e.g., by generating an encoded representation of each node of the graph, and combining (e.g., summing) the encoded representations of the nodes. An example process for generating an encoded representation 112 of the interaction history graph 108 is described in more detail with reference to FIG. 5.

The exploration system 100 uses the encoded representation 112 of the interaction history graph 108 at the current time step to generate an input that is processed by the action selection neural network 114 to generate an action selection output 116. The exploration system 100 uses the action selection output 116 to select the action to be performed by the agent at the time step, as will be described in more detail below.

The exploration system 100 may use the encoded representation 112 of the interaction history graph 108 at the current time step to generate the input to the action selection neural network 114 in any of a variety of ways. A few example techniques for generating the input to the action selection neural network 114 are described in more detail next.

In one example, the exploration system 100 may generate the input to the action selection neural network 114 as:

$$[f_a(a_{t-1}), f_g(G_{t-1})] \qquad (1)$$

where $f_a(a_{t-1})$ is a representation of the action performed at the previous time step, and $f_g(G_{t-1})$ is the encoded representation 112 of the current interaction history graph 108. The exploration system 100 may generate the representation of the action performed at the previous time step, e.g., as a one-hot encoding of the action, or as the output of an embedding neural network that processes the action.

In another example, the exploration system 100 may generate the input to the action selection neural network 114 based on encoded representations 112 of the interaction history graphs corresponding to: (i) the current time step, and (ii) each of one or more preceding time steps. That is, the exploration system 100 may generate an input to the action selection neural network 114 that characterizes the history of the exploration of the environment by the agent over multiple time steps. In one implementation, the exploration system 100 may generate the input $h_t$ to the action selection neural network 114 at each time step as:

$$h_t = R(h_{t-1}, f_g(G_{t-1})) \qquad (2)$$

where $R(\cdot)$ is a recurrent neural network, e.g., a long short-term memory (LSTM) neural network (e.g. not shown in FIG. 1 but provided in the exploration system 100 between the graph neural network 110 and the action selection neural network 114), $h_{t-1}$ is the input to the action selection neural network at the previous time step, and $f_g(G_{t-1})$ is the encoded representation 112 of the current interaction history graph 108. At the first time step, where no previous input to the action selection neural network exists, the exploration system 100 may provide the encoded representation 112 of the current interaction history graph 108 as the input to the action selection neural network 114. Selecting the action to be performed at the current time step based on the history of the exploration of the environment may enable more efficient exploration, i.e., by enabling the action selection neural network to reason more effectively about which actions will result in the environment transitioning into new states.

The exploration system 100 uses the action selection output 116 generated by the action selection neural network 114 to select the action to be performed by the agent 104 at the current time step. A few examples of using the action selection output 116 to select the action to be performed by the agent are described in more detail next.

In one example, the action selection output 116 may include a respective score for each action in a set of possible actions, e.g., possible torques to be applied to the joints of a robotic agent. The exploration system may select the action to be performed by the agent, e.g., as the action with the highest score, or as an action sampled from a probability distribution over the set of possible actions that is defined by the action scores. A probability distribution over the set of possible actions may be defined, e.g., by processing the action scores using a soft-max function.

In another example, the action selection output 116 may include a respective probability distribution over a set of possible tokens at each position in a sequence of multiple positions. The set of possible tokens may be, e.g., a set of alpha-numeric characters, and each action may be in the form of a string of characters that includes a respective character at each of multiple positions. The string of characters may be provided as an input to a set of program code in the context of software testing, as discussed above. The exploration system 100 may sample a respective token at each position starting from the first position using the corresponding probability distribution over the set of possible tokens.

Generally, the action selection neural network may have any appropriate neural network architecture that enables it to perform its described function, e.g., an auto-regressive architecture, a recurrent architecture, or a feed-forward architecture.

A training engine 118 can use reinforcement learning techniques to train the action selection neural network 114 to select actions that cause the agent to efficiently explore the environment. In particular, the training engine 118 can train the action selection neural network 114 to optimize a cumulative measure of rewards (e.g., a time-discounted sum of rewards) received by the agent over the course of its interaction with the environment.

The exploration system 100 may determine the reward at each time step based on the number of new states 120 the environment transitioned into as a result of the action performed by the agent at the time step (i.e., the number of new states the environment transitioned into after the agent performs the action at the time step but before the agent performs the next action at the next time step). A state is referred to as "new" if the environment did not transition into the state at any preceding time step. Training the action selection neural network 114 to optimize a cumulative measure of these rewards encourages the action selection neural network to select actions that cause that cause the environment to transition into as many new states as possible, thereby enabling the agent to efficiently explore the environment. The training engine 118 may train the action selection neural network 114 using any appropriate reinforcement learning training technique, e.g., an actor-critic reinforcement learning technique.

In some implementations, the exploration system 100 may be configured to select actions to enable the agent to interact with the environment for only a finite, predefined number of time steps, e.g., 100 time steps, 1000 time steps, or any other appropriate number of time steps. The predefined number of time steps may represent a "budget", e.g., of time or computational resources, that can be devoted to exploring the environment. In these implementations, the action selection neural network 114 may maintain a different set of parameter values corresponding to each time step, and may generate the action selection output at each time step using the corresponding set of parameter values. During training, the set of parameter values corresponding to each time step may be updated independently of the sets of parameter values corresponding to the other time steps.

The training engine 118 may train the graph neural network 110, e.g., by backpropagating gradients through the action selection neural network into the graph neural network 110. Alternatively or in combination, the training engine 118 may train the graph neural network 110 to optimize an "unsupervised link prediction" objective, as will be described in more detail with reference to FIG. 5.

The training engine 118 may train the exploration system 100 on interactions of the agent with one or more "training" environments to learn a generalizable action selection policy that can select actions that enable efficient exploration in one or more previously unseen environments. In particular, the exploration system may select actions that enable the agent to efficiently explore the previously unseen environments without being further trained on interactions of the agent with the previously unseen environments. In one example, in the setting of using the exploration system to perform software testing by exploring user interfaces of software applications, the training engine 118 may train the exploration system 100 on interactions of the agent with a limited number of "training" software applications. Thereafter, the exploration system 100 can be deployed to efficiently explore the user interfaces of previously unseen software applications without further training.

Figure 2:
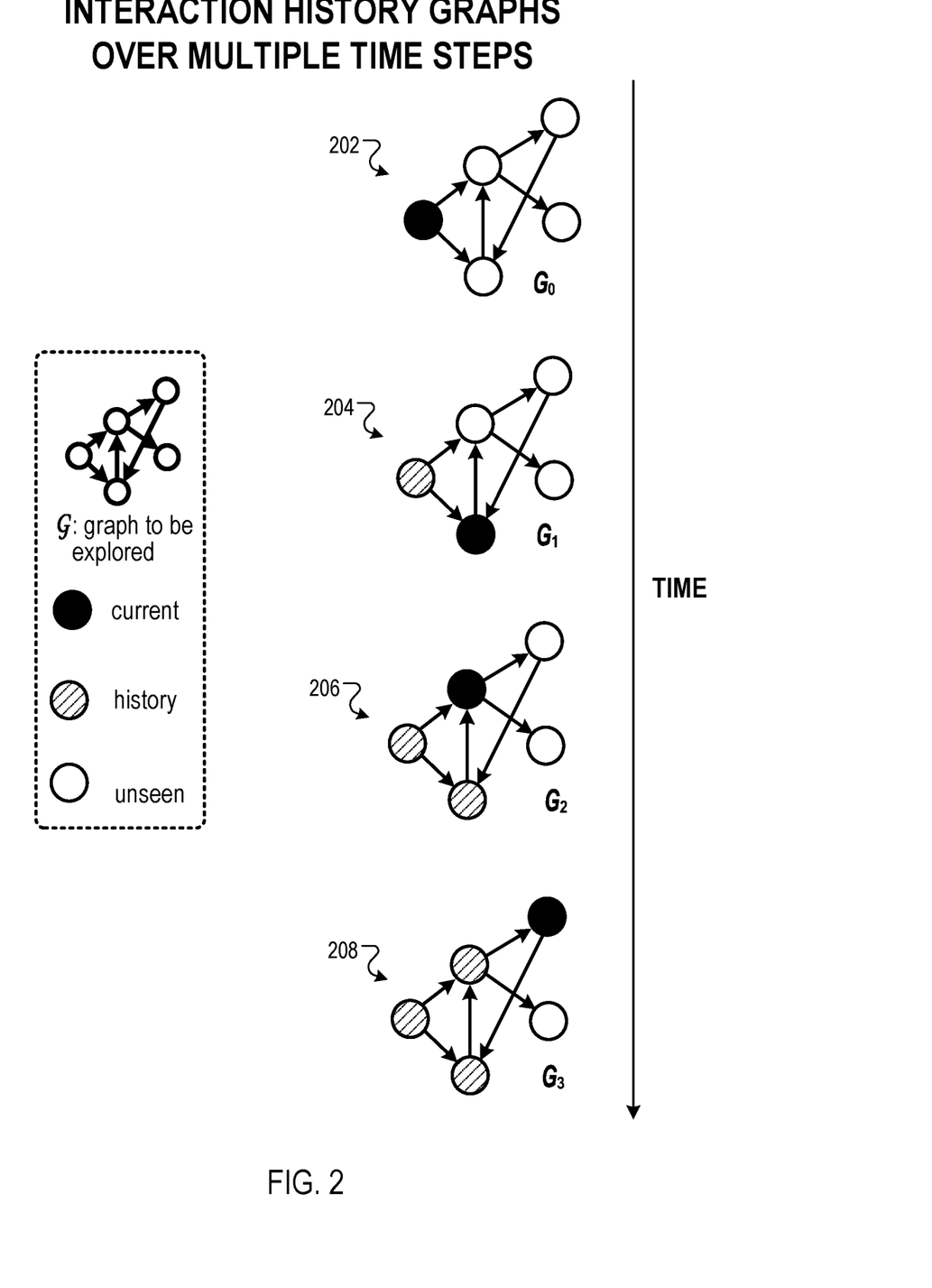
FIG. 2 illustrates examples of interaction history graphs that characterize the exploration of an environment by an agent over multiple time steps.

FIG. 2 illustrates examples of interaction history graphs that characterize the exploration of an environment by an agent over multiple time steps. Each node in the graph represents a possible state of the environment, and each edge represents a possible transition between respective states of the environment. The graphs 202, 204, 206, and 208, respectively correspond to time steps T=1, T=2, T=3, and T=4. For each graph, the dark node represents the current state of the environment at the time step, hatched nodes represent environment states that have been visited at a previous time step, and unshaded nodes represent environment states that the environment has not transitioned into as of the time step. The exploration system described in this specification selects the action to be performed by the agent at each time step by processing an encoded representation of the interaction history graph at the time step, and optionally, for one or more previous time steps, as described with reference to FIG. 1.

Figure 3:
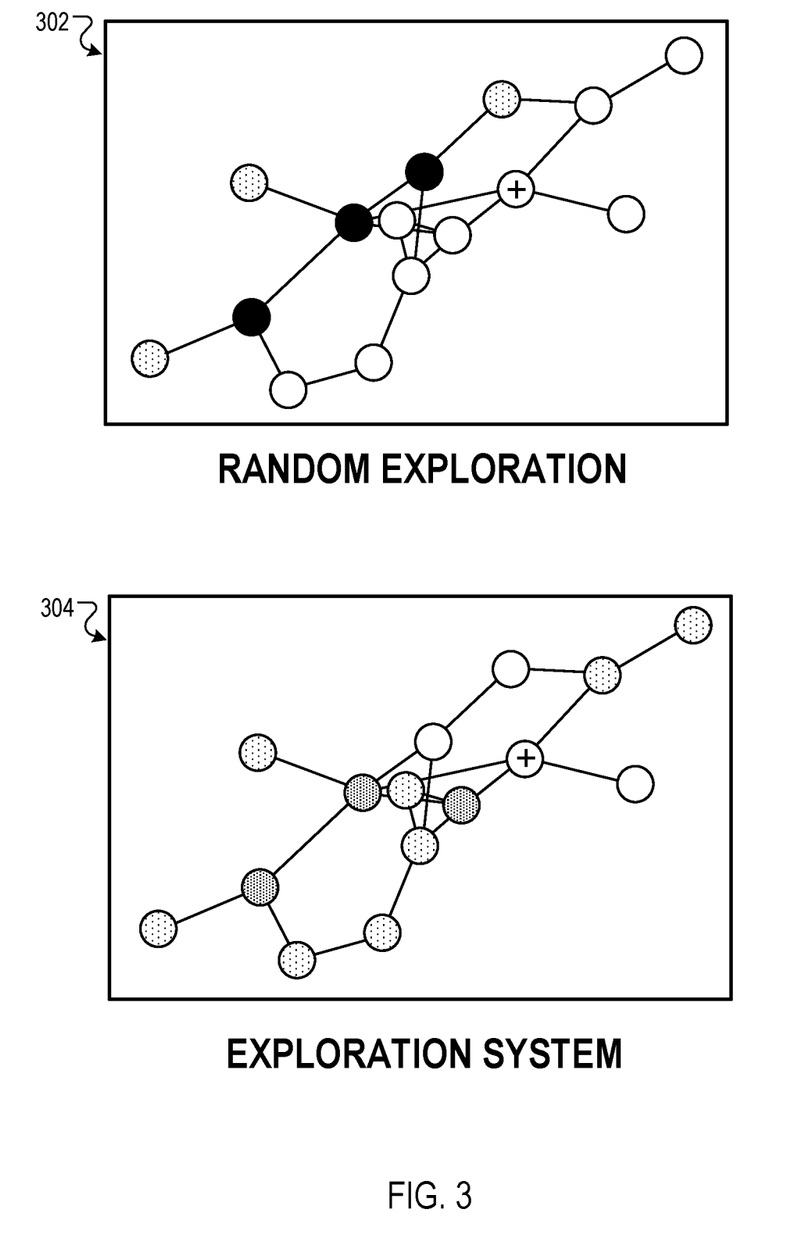
FIG. 3 illustrates an example of exploring a user interface of a software application using random exploration and using the exploration system.

FIG. 3 illustrates an example of exploring a user interface of a software application using random exploration (302) and using the exploration system described in this specification (304). Each node in the graph represents a distinct "screen" in the user interface of the software application, and edge in the graph represents a possible transition between screens in the user interface. The node with a plus sign (i.e., "+") indicates the node from which exploration starts; for each other node, the shade of the node represents the number of times the graphical user interface transitions into the state corresponding to the node, with darker shades indicating larger numbers of transitions. It can be appreciated that the random exploration technique becomes stuck in a local neighborhood of the graph and repeatedly revisits certain nodes large numbers of times, while the exploration system described in this specification succeeds in visiting most nodes in the graph at least once.

Figure 4:
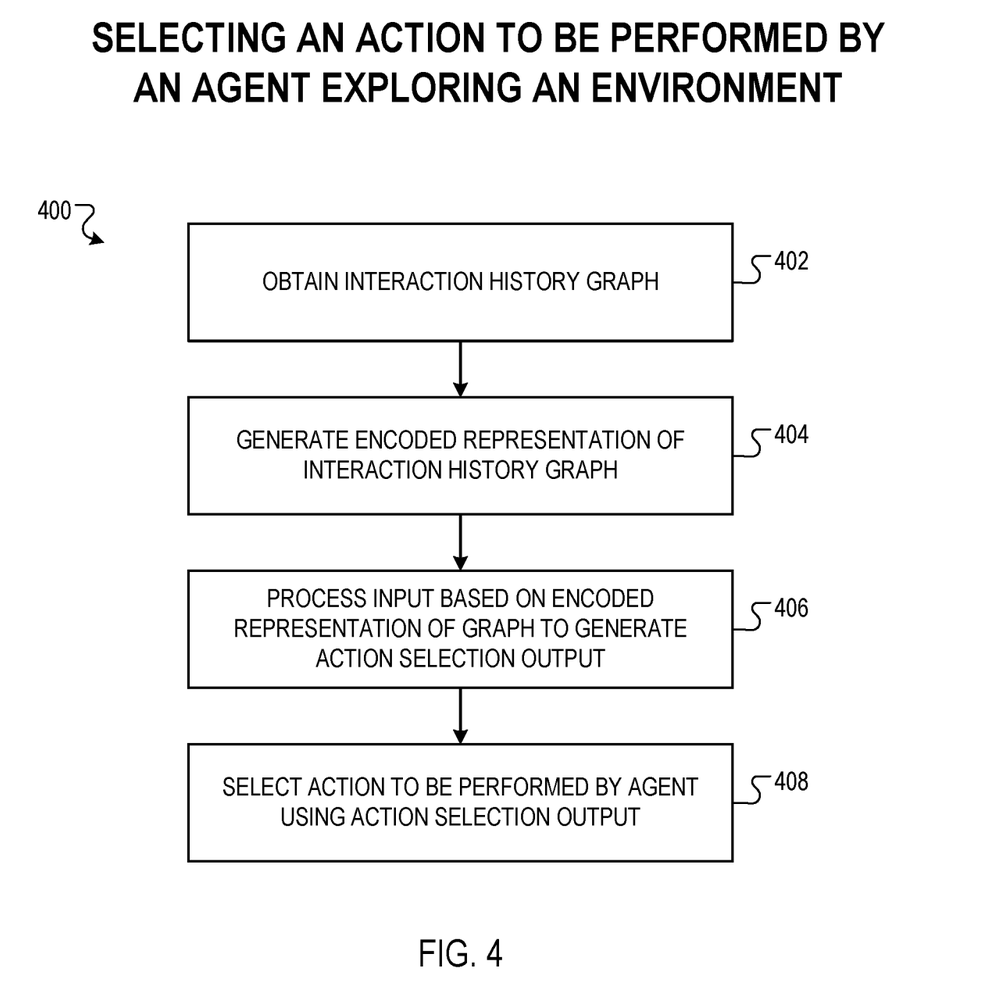
FIG. 4 is a flow diagram of an example process for selecting an action to be performed by an agent exploring an environment.

FIG. 4 is a flow diagram of an example process 400 for selecting an action to be performed by an agent exploring an environment. For convenience, the process 400 will be described as being performed by a system of one or more computers located in one or more locations. For example, an exploration system, e.g., the exploration system 100 of FIG. 1, appropriately programmed in accordance with this specification, can perform the process 400.

The system obtains a graph that represents an interaction history of the agent with the environment (402).

The system generates an encoded representation of the graph representing the interaction history of the agent with the environment (404).

The system processes an input based on the encoded representation of the graph using an action selection neural network to generate an action selection output (406).

The system selects an action from a set of possible actions to be performed by the agent using the action selection output generated by the action selection neural network (408).

Figure 5:
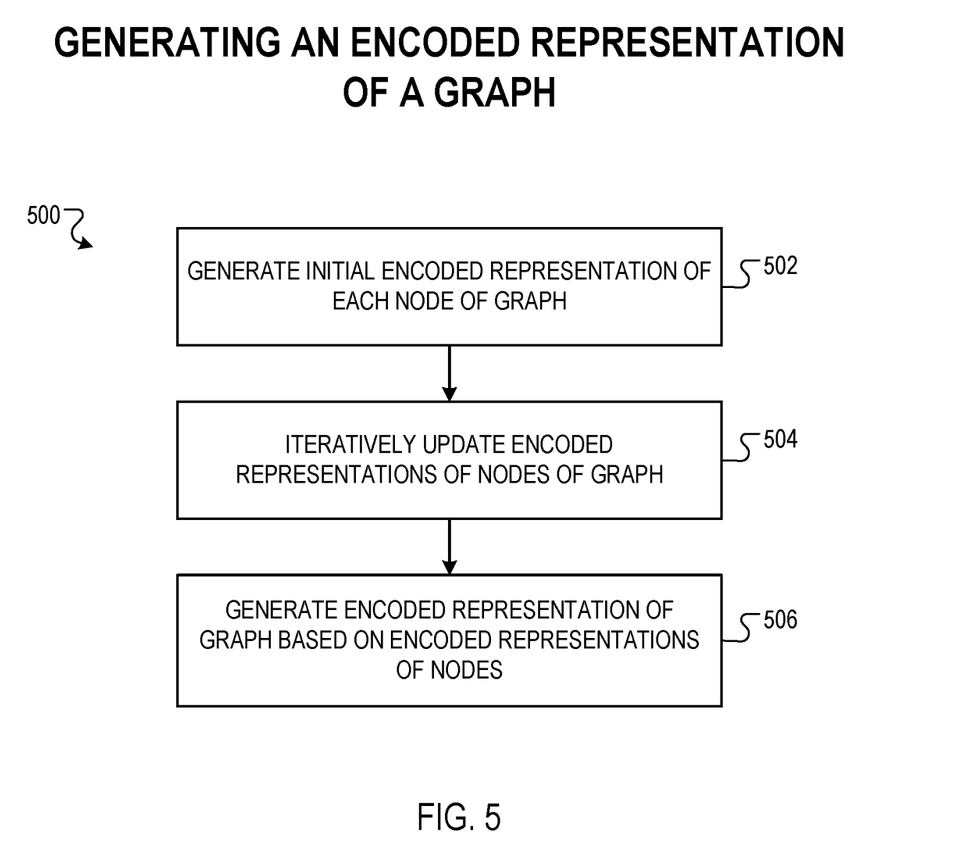
FIG. 5 is a flow diagram of an example process for generating an encoded representation of a graph.

FIG. 5 is a flow diagram of an example process 500 for generating an encoded representation of a graph, e.g., an interaction history graph, as described with reference to FIG. 1. For convenience, the process 500 will be described as being performed by a system of one or more computers located in one or more locations. For example, an exploration system, e.g., the graph neural network 110 of the exploration system 100 of FIG. 1, appropriately programmed in accordance with this specification, can perform the process 500.

The system generates an initial encoded representation of each node of the graph (502). The encoded representation of a node in the graph is a representation of the node as an ordered collection of numerical values, e.g., a vector or matrix of numerical values. The system may generate the initial encoded representation of each node based on characteristics of the environment state corresponding to the node. For example, if each environment state corresponds to a respective state of a graphical user interface of a software application, the system may generate the initial encoded representation of each state by processing an image depicting the state of the graphical user interface using one or more embedding neural network layers.

Optionally (e.g., in the case of a graph that represents every state of a known environment), the initial encoded representation of each node may include data (e.g., a binary variable) specifying whether the environment has transitioned into the state corresponding to the node at a previous time step.

The system iteratively updates the encoded representations of the nodes of the graph over multiple update iterations (504). In particular, at each update iteration, the system may update the current encoded representation of each given node of the graph based on the current encoded representations of a set of neighboring nodes of the given node in the graph. The set of neighboring nodes for a given node may include: (i) the given node, and (ii) each other node in the graph that is connected to the given node by an edge.

In one example, the system may determine the encoded representations $\{\mu_v^{(l+1)}\}_{v \in V}$ at iteration (l+1), where V is the set of nodes and each v indexes a respective node, as:

$$m_v^{(l+1)} = \text{Aggregate}(\{\text{MLP}[\mu_v^{(l)}, \mu_u^{(l)}, k]\}_{u \in \mathcal{N}^k(v), k \in 1, 2, \ldots, K}) \quad (3)$$

$$\mu_v^{(l+1)} = \text{GRU}(\mu_v^{(l)}, m_v^{(l+1)}) \quad (4)$$

where MLP(•) represents a fully-connected neural network layer, Aggregate(•) may represent, e.g., a sum, mean, or max aggregation operation, GRU(•) represents a gated recurrent unit neural network block, K is a predefined positive integer value, and $N^k(v)$ represents the set of nodes that are connected to the node v by a path of length less than or equal to k in the graph. The path length between two nodes in a graph refers to the number of edges that separate the two nodes.

The number of update iterations L (l=0, . . . , L−1) may be predefined; for example, the system may update the encoded representations of the nodes over 5 update iterations, 10 update iterations, or any other appropriate number of update iterations.

The system combines the encoded representations of the nodes of the graph after the final update iteration to generate the encoded representation of the graph (506). In one example, the system may generate the encoded representation of the graph $f_g(G)$ by summing the encoded representations of the nodes of the graph. In another example, the system may generate the encoded representation of the graph $f_g(G)$ as a weighted linear combination of the encoded representations of the nodes of the graph, e.g., as:

$$f_g(G) = \sum_{v \in V} \alpha_v \cdot \mu_v^{(L)} \quad (5)$$

where V is the set of nodes, each v indexes a respective node, each $a_v$ is a scalar weighting factor corresponding to a respective node, and each $\mu_v^{(L)}$ is the encoded representation of a corresponding node after a final update iteration (as described with reference to step 504). The system may determine each scalar weighting factor $a_v$ as:

$$\alpha_v = \frac{\exp(W^T \mu_v^{(L)})}{\Sigma_{u \in v} \exp(W^T \mu_u^{(L)})} \quad (6)$$

where W is a learned weight matrix. In another example, the system may generate the encoded representation of the graph by sequentially processing the encoded representations of the nodes using a recurrent neural network, and identifying the output of the recurrent neural network after processing the encoded representation of the last node as the encoded representation of the graph.

The parameters of the graph neural network used to generate the encoded representation of the graph (e.g., including the parameters of the fully-connected layer MLP (•) and the gated recurrent unit neural network block GRU(•) described with reference to equations (3)-(4), and the learned weight matrix W described with reference to equation (6)), may be trained by backpropagating gradients of a reinforcement learning objective function through the action selection neural network, as described with reference to FIG. 1. Alternatively or in combination, the parameters of the graph neural network may be trained to optimize an unsupervised link prediction objective given by:

$$\sum_{i,j \in V} \left( A_{i,j} - \mu_i^{(L)T} X \mu_j^{(L)} \right)^2 \quad (7)$$

where V is the set of nodes of the graph, i and j index respective nodes, $A_{i,j}$ indicates whether node i is connected to node j by an edge, X is a learned weight matrix, $\mu_i^{(L)}$ is the encoded representation corresponding to node i after the final update iteration, and $\mu_j^{(L)}$ is the encoded representation corresponding to node j after the final update iteration. In one example, the graph neural network may be trained for one or more initial training iterations using the unsupervised link prediction objective (e.g., to effectively initialize the parameter values), and thereafter trained by backpropagating gradients of the reinforcement learning objective function through the graph neural network. Training the graph neural network to optimize the unsupervised link prediction objective encourages the graph neural network to generate encoded representations of nodes that capture structural information from the graph.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for selecting actions to be performed by an agent interacting with an environment, the method comprising:
   obtaining data defining an interaction history graph of nodes and edges that represents an interaction history of the agent with the environment, wherein:
      each node in the interaction history graph represents a possible state of the environment,
      each edge in the interaction history graph connects a respective pair of nodes in the interaction history graph, and
      an edge in the interaction history graph connects a pair of nodes in the interaction history graph only if the state of the environment can transition from one of the nodes in the pair of nodes to the other node in the pair of nodes;
   processing data defining the interaction history graph representing the interaction history of the agent with the environment using a graph neural network to generate an encoded representation of the interaction history graph, comprising:
      obtaining a respective encoded representation of each node in the interaction history graph;
      iteratively updating the encoded representations of the nodes in the interaction history graph, over a plurality of update iterations, in accordance with values of a set of graph neural network parameters; and
      generating the encoded representation of the interaction history graph by combining the encoded representations of the nodes in the interaction history graph;
   processing an input based on the encoded representation of the interaction history graph using an action selection neural network, in accordance with current values of action selection neural network parameters, to generate an action selection output; and
   selecting an action from a plurality of possible actions to be performed by the agent using the action selection output generated by the action selection neural network.

2. The method of claim 1, further comprising:
   identifying one or more new states of the environment, wherein: (i) the state of the environment transitions into the one or more new states as a result of the agent performing the selected action, and (ii) the state of the environment did not previously transition into any of the new states as a result of the agent performing previously selected actions during the interaction of the agent with the environment;
   determining a reward based on the new states of the environment; and
   adjusting the current values of the action selection neural network parameters based on the reward using a reinforcement learning technique.

3. The method of claim 2, wherein determining the reward based on the new states of the environment comprises:
   determining the reward based on the number of new states of the environment.

4. The method of claim 1, wherein each node in the graph that represents the interaction history of the agent with the environment corresponds to a state of the environment that the environment previously transitioned into as a result of the agent performing previously selected actions during the interaction of the agent with the environment.

5. The method of claim 4, wherein each edge in the graph connects a pair of nodes in the graph only if the state of the environment previously transitioned from one of the nodes in the pair of nodes to the other node in the pair of nodes as a result of the agent performing previously selected actions during the interaction of the agent with the environment.

6. The method of claim 4, wherein the environment is a software environment, each state of the software environment corresponds to a respective state of a user interface of the software environment, and the action selected to be performed by the agent defines a particular interaction with the user interface of the software environment.

7. The method of claim 4, wherein the environment is a real-world environment, each state of the real-world environment corresponds to a respective spatial position in the real-world environment, the agent is a robotic agent interacting with the real-world environment, and the action selected to be performed by the agent defines a physical action that causes the agent to move in the real-world environment.

8. The method of claim 1, wherein:
the nodes in the graph that represents the interaction history of the agent with the environment represent every possible state of the environment; and
each node in the graph is associated with data that indicates whether the environment previously transitioned into the state represented by the node as a result of the agent performing previously selected actions during the interaction of the agent with the environment.

9. The method of claim 8, wherein the environment is a software environment defined by a set of program code, each state of the software environment corresponds to execution of a respective element of the set of program code, and the action selected to be performed by the agent defines an input to be provided to the software environment.

10. The method of claim 1, wherein combining the encoded representations of the nodes in the interaction history graph comprises summing the encoded representations of the nodes in the interaction history graph.

11. The method of claim 10, wherein summing the encoded representations of the nodes in the interaction history graph comprises:
determining a respective weight factor for the encoded representation of each node in the graph; and
scaling the encoded representation of each node in the graph using the respective weight factor prior to summing the encoded representations of the nodes in the interaction history graph.

12. The method of claim 1, wherein
iteratively updating the encoded representations of the nodes in the interaction history graph over the plurality of update iterations, comprises, at each update iteration after a first iteration of the plurality of update iterations:
for each given node of the graph, updating the encoded representation of the node at the current iteration based on the encoded representations of a set of neighboring nodes of the given node in the graph at a previous iteration in accordance with values of the set of graph neural network parameters,
wherein the set of neighboring nodes of the given node in the graph comprises: (i) the given node, and (ii) each other node in the graph that is connected to the given node by an edge of the graph; and
determining the encoded representation of each node of the interaction history graph as the encoded representation of the node after a last iteration of the plurality of update iterations.

13. The method of claim 12, further comprising:
determining the encoded representation of each node of the interaction history graph at the first iteration of the plurality of update iterations based on characteristics of the state of the environment represented by the node.

14. The method of claim 1, wherein the current values of the action selection neural network parameters are determined during interaction of the agent with a previous environment and are not adjusted during the interaction of the agent with the environment.

15. The method of claim 1, wherein the input to the action selection neural network is based on: (i) the encoded representation of the graph, and (ii) encoded representations of one or more previous graphs, wherein each previous graph represents an interaction history of the agent with the environment as of a respective previous time step.

16. The method of claim 15, further comprising:
using a recurrent neural network to process an input comprising: (i) the encoded representation of the graph, and (ii) an output of the recurrent neural network at a previous time step, to generate a recurrent neural network output;
wherein the input to the action selection neural network comprises the recurrent neural network output.

17. A system comprising one or more computers and one or more storage devices storing instructions that when executed by the one or more computers cause the one or more computers to perform operations for selecting actions to be performed by an agent interacting with an environment, the operations comprising:
obtaining data defining an interaction history graph of nodes and edges that represents an interaction history of the agent with the environment, wherein:
each node in the interaction history graph represents a possible state of the environment,
each edge in the interaction history graph connects a respective pair of nodes in the interaction history graph, and
an edge in the interaction history graph connects a pair of nodes in the interaction history graph only if the state of the environment can transition from one of the nodes in the pair of nodes to the other node in the pair of nodes;
processing data defining the interaction history graph representing the interaction history of the agent with the environment using a graph neural network to generate an encoded representation of the interaction history graph, comprising:
obtaining a respective encoded representation of each node in the interaction history graph;
iteratively updating the encoded representations of the nodes in the interaction history graph, over a plurality of update iterations, in accordance with values of a set of graph neural network parameters; and
generating the encoded representation of the interaction history graph by combining the encoded representations of the nodes in the interaction history graph;
processing an input based on the encoded representation of the interaction history graph using an action selection neural network, in accordance with current values of action selection neural network parameters, to generate an action selection output; and
selecting an action from a plurality of possible actions to be performed by the agent using the action selection output generated by the action selection neural network.

18. One or more non-transitory computer storage media storing instructions that when executed by one or more computers cause the one or more computers to perform operations for selecting actions to be performed by an agent interacting with an environment, the operations comprising:
obtaining data defining an interaction history graph of nodes and edges that represents an interaction history of the agent with the environment, wherein:
each node in the interaction history graph represents a possible state of the environment,
each edge in the interaction history graph connects a respective pair of nodes in the interaction history graph, and
an edge in the interaction history graph connects a pair of nodes in the interaction history graph only if the state of the environment can transition from one of the nodes in the pair of nodes to the other node in the pair of nodes;
processing data defining the interaction history graph representing the interaction history of the agent with the environment using a graph neural network to generate an encoded representation of the interaction history graph, comprising:
   obtaining a respective encoded representation of each node in the interaction history graph;
   iteratively updating the encoded representations of the nodes in the interaction history graph, over a plurality of update iterations, in accordance with values of a set of graph neural network parameters; and
   generating the encoded representation of the interaction history graph by combining the encoded representations of the nodes in the interaction history graph;
processing an input based on the encoded representation of the interaction history graph using an action selection neural network, in accordance with current values of action selection neural network parameters, to generate an action selection output; and
selecting an action from a plurality of possible actions to be performed by the agent using the action selection output generated by the action selection neural network.

\* \* \* \* \*